350-392 SR
XR 2,670,402 D
350-150

Feb. 23, 1954 A. M. MARKS 2,670,402

SCREEN FOR PRODUCING TELEVISION IMAGES

Filed Nov. 23, 1948 7 Sheets-Sheet 1

INVENTOR.
Alvin M. Marks
BY
Cousins & Cousins
Attorneys.

2670402
OR IN 350/230

Feb. 23, 1954 A. M. MARKS 2,670,402

SCREEN FOR PRODUCING TELEVISION IMAGES

Filed Nov. 23, 1948 7 Sheets-Sheet 2

INVENTOR.

Alvin M. Marks

BY Cousins & Cousins

ATTORNEYS

SCREEN FOR PRODUCING TELEVISION IMAGES

Filed Nov. 23, 1948 7 Sheets-Sheet 3

INVENTOR.

Alvin M. Marks

BY Cousins & Cousins

ATTORNEYS

Feb. 23, 1954 A. M. MARKS 2,670,402

SCREEN FOR PRODUCING TELEVISION IMAGES

Filed Nov. 23, 1948 7 Sheets-Sheet 4

INVENTOR.
Alvin M. Marks
BY
Cousins & Cousins
Attorneys.

INVENTOR.
Alvin M. Marks
BY
Cousins & Cousins
Attorneys.

Feb. 23, 1954 A. M. MARKS 2,670,402

SCREEN FOR PRODUCING TELEVISION IMAGES

Filed Nov. 23, 1948 7 Sheets-Sheet 6

INVENTOR.

Alvin M. Marks

BY Cousins & Cousins

ATTORNEYS.

SCREEN FOR PRODUCING TELEVISION IMAGES

Filed Nov. 23, 1948 7 Sheets-Sheet 7

INVENTOR.
Alvin M. Marks
BY Cousins & Cousins
ATTORNEYS.

Patented Feb. 23, 1954 2,670,402

UNITED STATES PATENT OFFICE 2,670,402

SCREEN FOR PRODUCING TELEVISION IMAGES

Alvin M. Marks, Beechhurst, N. Y.

Application November 23, 1948, Serial No. 61,697

9 Claims. (Cl. 178—7.3)

This invention relates to a novel type of two-dimensional viewing screen for the display of television or motion pictures, and is a continuation in part of an application for patent entitled "Three Dimensional Inter-Communication Systems," Serial No. 710,316, filed November 16, 1946.

Presently known two-dimensional viewing screens for television systems employ the well known cathode ray tube either as a projection image source or as a direct view screen. However, these tubes have many undesirable characteristics. Among the difficulties experienced with the cathode ray tube are: the added depth required behind the viewing screen surface for each small increase in the size of said screen; the limited amount of light intensity produced by the tube; the distortion to the image resulting from the curved surface of the tube, and the limited operating life of the said tube.

Accordingly, it is an object of this invention to provide a two-dimensional viewing screen for the display of television or motion pictures, which will be free of the limitations found in presently known devices.

Another object of this invention is to produce a screen which is self-luminous, relatively thin, and which may be made without limitations as to size of viewing area.

A further object of this invention is to scan the screen in one or more dimensions by means of a "dissipationless lumped-constant line."

An object of this invention is to scan in one or more dimensions by means of a plurality of cavities, which respond to microwave excitation means.

A feature of this invention is its novel microwave multi-resonator tube, based on the klystron principle, which is used as a scanning means.

Another feature of this invention is the provision of a scanning means comprising a wave guide into which is piped a variable frequency microwave.

The invention consists of the construction, combination, arrangement of parts, and the steps of the method, as herein illustrated, described and claimed.

In the accompanying drawings, forming part hereof, are illustrated several forms of embodiment of the invention, in which drawings similar reference characters designate corresponding parts, and in which.

One of the preferred embodiments of the present invention in its broad aspects, consists of a screen having a sheet of light polarizing material in front and in back thereof, said polarizers being crossed so as to substantially extinguish light impinging upon the rear polarizer; a light source located behind the rearmost polarizer, and means within the screen and associated therewith whereby selected portions thereof may be activated to rotate the plane of polarization of the light after it leaves the rear polarizer, thereby enabling said light to traverse the front polarizer and be viewed. Means are also provided for scanning the screen so that the transmitted light will paint a picture upon the screen. Since it is necessary to modulate the intensity of the light coming through the screen, in order to create the said picture, light intensity modulation means are also provided.

The first embodiment of this invention employs the parallel electro-optic effect, obtained with certain crystals such as ammonium dihydrogen phosphate crystals, also known as "PN crystals." These crystals have the property of introducing a linear change in the refractive indices with the strength of the applied electric field which causes a corresponding rotation of the plane of polarization of the light passing through the crystal.

Figures 1, 2, 3, 4, 5:
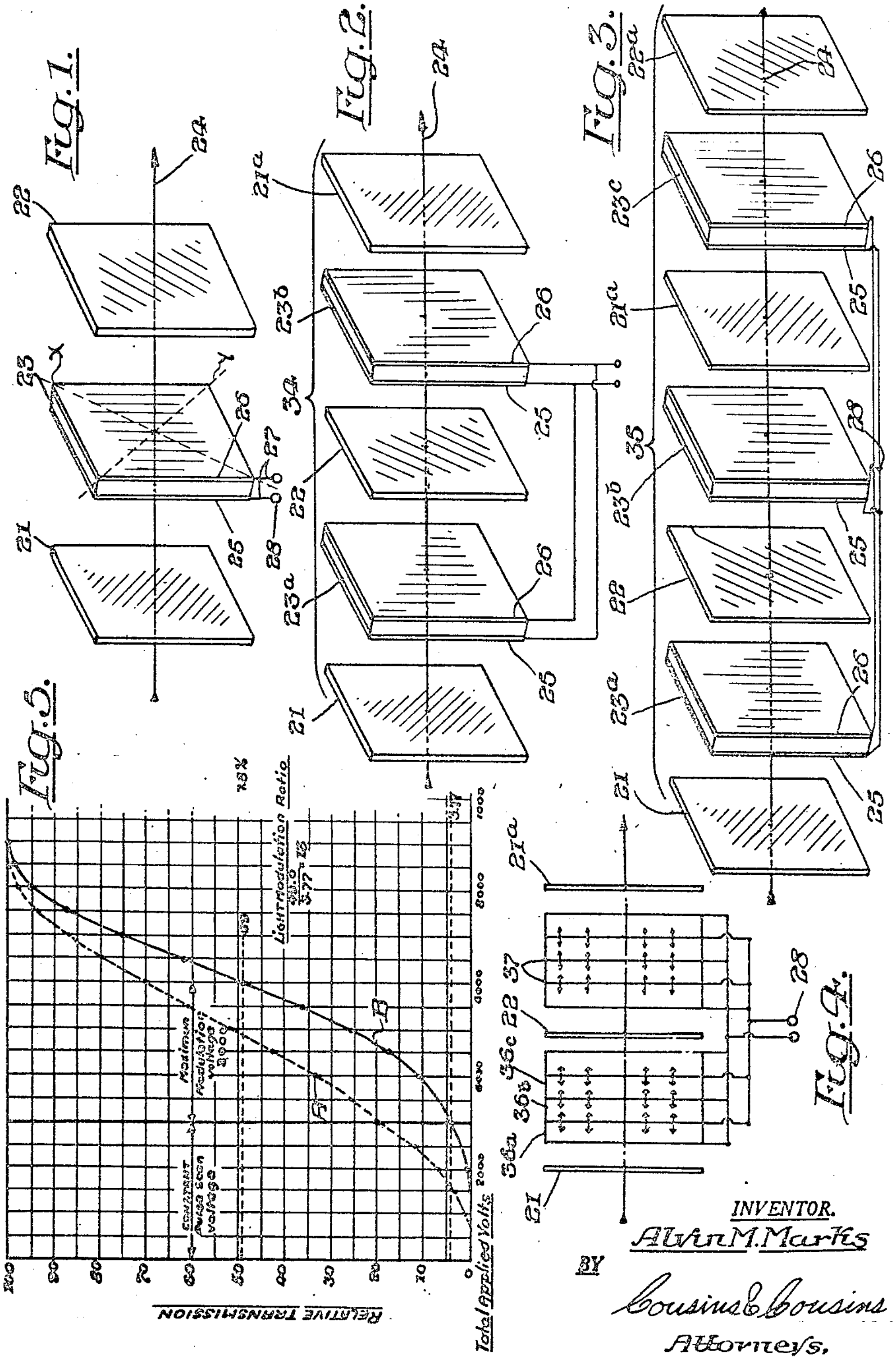
Figure 1 is a somewhat exploded view in perspective of a conventional electro-optic shutter employing the parallel electro-optic effect.
Figure 2 is a somewhat exploded view in perspective of a two-section electro-optic shutter according to this invention, to achieve, under certain conditions of operation, a greater ratio between the maximum and minimum light transmission possible with the shutter shown in Figure 1.
Figure 3 is a somewhat exploded view in perspective of a three-section electro-optic shutter which comprises a modification of the structure shown in Figure 2.
Figure 4 is a somewhat diagrammatic vertical section of a modification of the two-section shutter whereby lower operating voltages may be employed.
Figure 5 is a graphical representation, showing the operating characteristics of the two-section shutter, shown in Figure 2 as a solid line, and the characteristics of the single shutter, shown in Figure 1, as a dashed line.

Referring to the drawings, and particularly to Figure 1, there are shown two polarizing sheets 21, 22, having polarizing axes at right angles to each other, coinciding with the shading lines thereon. A transparent PN or other suitable plate 23 is interposed between the polarizers 21, 22. Said plate 23 has its Z or optical axis coincident with a beam of light 24 directed at the plate 23 and normal thereto. The Y axis of the crystal plate 23 is parallel to the polarizing axis of the sheet 21. Transparent electrodes 25, 26 are mounted upon the faces of the crystal 23. Conductors 27 are attached to the electrodes 25, 26, said conductors 27 ending in the terminals 28.

Since the polarizing axes of the sheets 21, 22 are at right angles to each other, light 24 directed at the rear of sheet 21 will not be able to pass through sheet 22. However, if an electric field be applied to the faces of the crystal plate 23, the light from the first sheet 21, upon entering the plate 23 will be caused to rotate its plane of polarization, thus allowing passage of light through the second sheet 22, which will then become visible.

Figure 6:
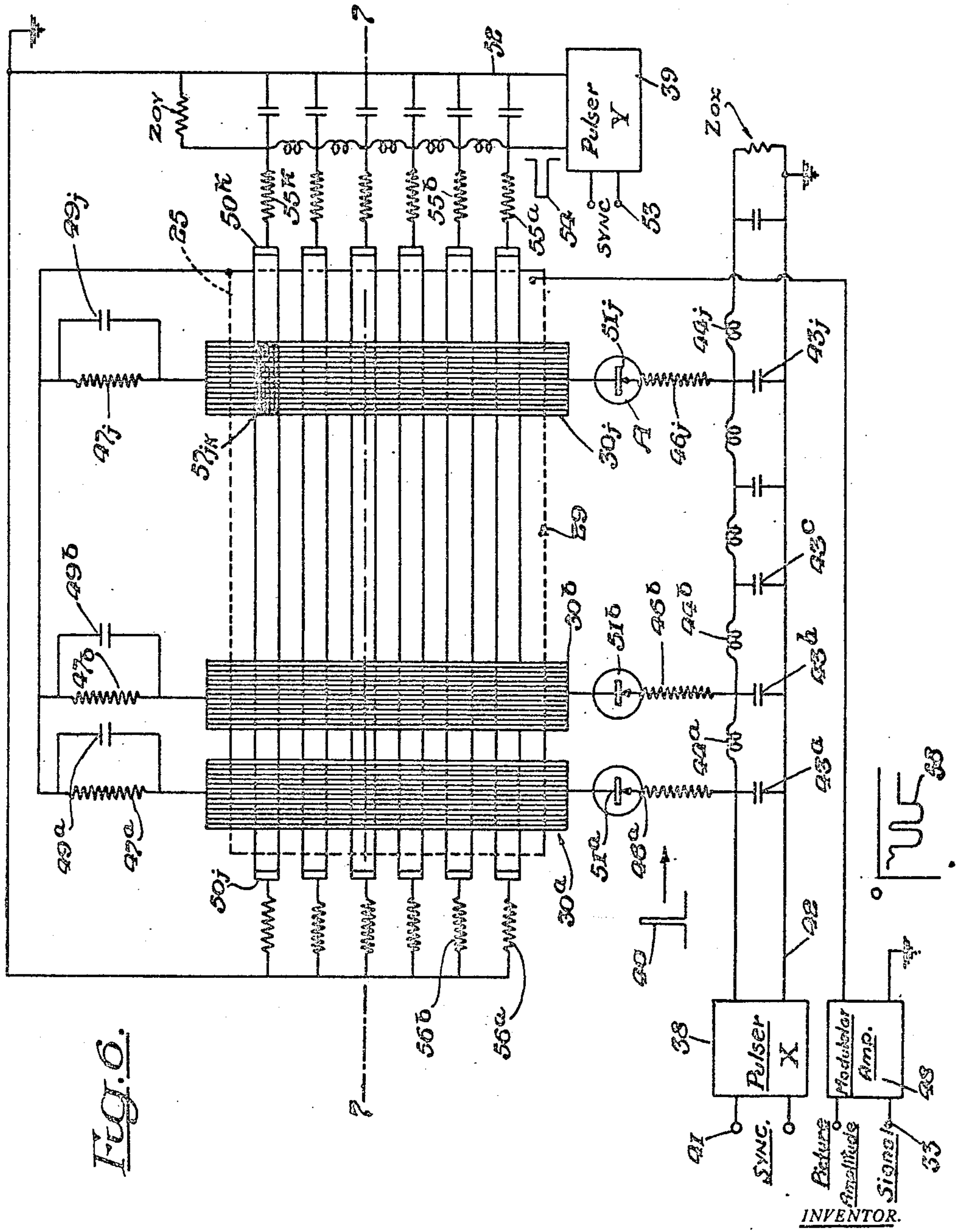
Figure 6 is a somewhat schematic view taken in front elevation, of a two-dimensional screen and its associated circuits constructed in accordance with this invention.
Figures 2, 7, 11:
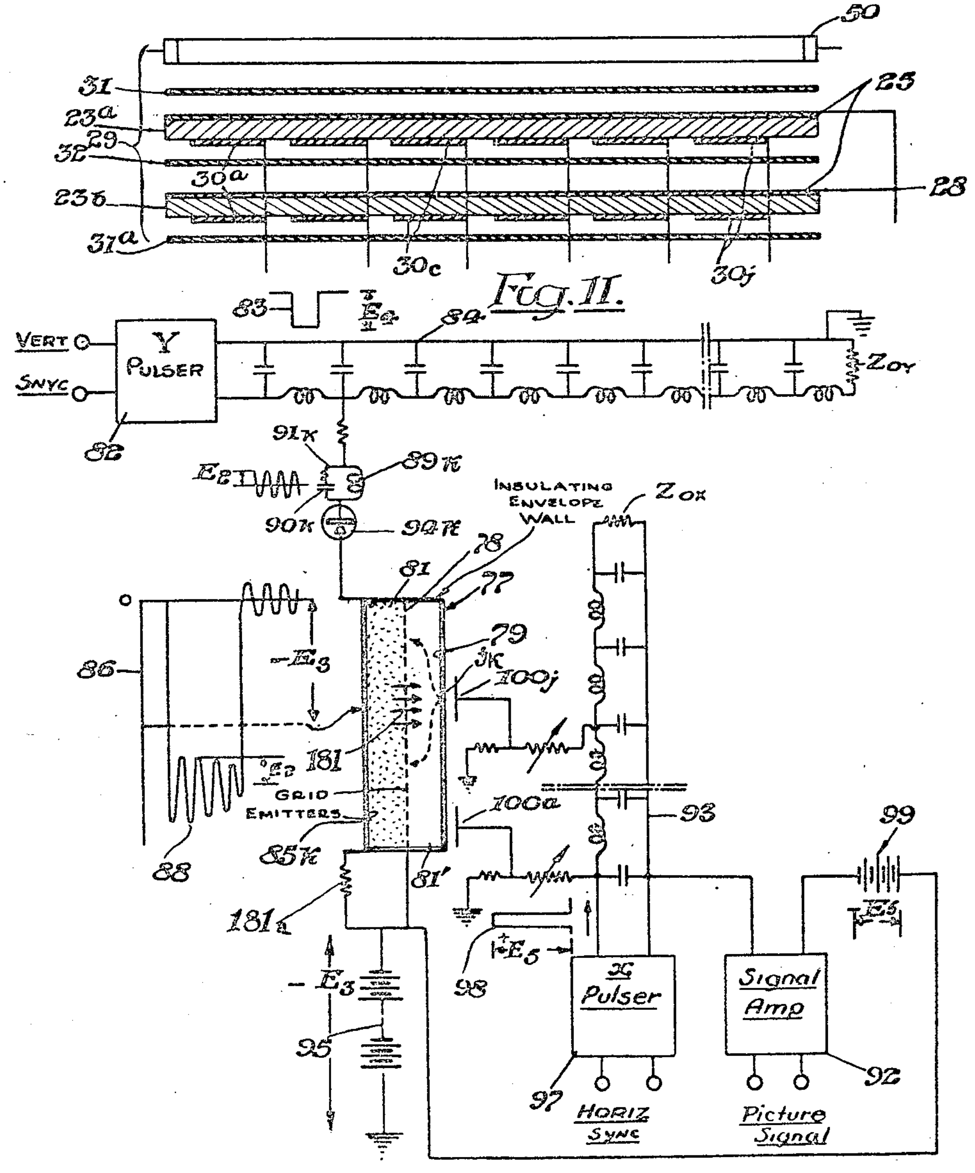
Figure 7 is a horizontal section through the screen, taken on line 7—7 of Figure 6.
Figure 11 is a somewhat schematic view of a second embodiment of the invention with the screen shown in horizontal section.

In the complete embodiment of the invention shown in Figures 6 and 7, crystal plate 23 has been enlarged to include the entire area of the screen 29 either as a single crystal or a mosaic of crystals. One of the electrodes 25 may also be coextensive with the enlarged crystal plate. The other electrode 26, however, now appears as a series of parallel strips 30*a*, 30*b*, 30*c* . . . 30*j*, etc. These strips have been greatly enlarged in the drawing for the sake of clarity. Large polarizers 31, 32 are placed behind and in front of the screen 29, respectively. The polarizers are co-extensive in size with the crystal area and have their axes of polarization crossed. Thus, if a voltage is applied (between the crossed polarizing plates 31, 32) between the strip 30*j* and the rear electrode 25, only light impinging upon the screen at that portion of its area between the strip 30*j* and the rear electrode 25 will pass through the front polarizer 32 and become visible.

In order to employ the above described action for the purposes of this invention, it is necessary to successively activate the strips 30*a*, 30*b*, etc. so as to scan the entire area of the screen 29. It is further required that the light transmission of each point of the screen be modulated by the impressed picture signal and correlated wth the scanning means. Electronic means for performing these operations are hereinafter set forth. The number of strips 30 should correspond to the number of lines to be scanned in the particular screen.

The scanning and modulating system employed in conjunction with the invention will be referred to as "pulse scanning and modulating." In this system a picture amplitude modulated signal 33 is impressed across all of the horizontal or vertical conducting elements of the screen 29, while a traveling electric pulse activates the conducting elements successively. The means by which this is brought about will be explained more fully in connection with Figure 6.

The response characteristics of the two-section shutter 34 shown in Figure 2 is shown as curve B in Figure 5. As may be seen from an examination of this curve, a voltage of approximately 3000 volts is required to reach the knee of the response characteristics curve. Until this voltage is reached practically no light will be transmitted through the shutter 34. If a modulation voltage be applied to the shutter 34 in addition to the initial voltage, up to a total modulation voltage of 3000 volts, a substantial light output may be produced. This modulation voltage is applied simultaneously to all the vertical screen conductive elements. The modulation voltage must not exceed the pulse scan voltage. The maximum modulation voltage should equal the constant pulse scan voltage. A modulation ratio of approximately 13 to 1 is obtainable wth a two-section shutter with the values of voltage chosen and graphically illustrated in Figure 5. By modulation ratio is meant the ratio of maximum light intensity with maximum applied modulation voltage to the minimum light intensity when zero modulation voltage is applied, as indicated on Figure 5.

The response characteristic curve A of a single section shutter is also shown upon the graph in Figure 5. The single shutter curve rises more gradually than that of the two-section shutter. For this reason the modulation ratio is limited to approximately 5 to 1 in the single section shutter. This ratio may be insufficient for satisfactory contrast ratio of light and dark areas on the screen. The three-section shutter 35, shown in Figure 3, on the other hand, is capable of producing modulation ratios of the order of 30 or more.

In Figure 4 there is shown a further modification of the two-section shutter 34, shown in Figure 2. This construction comprises a plurality of crystal plates 36*a*, 36*b*, 36*c*, etc., respectively, interleaved with transparent electrodes 37 connected as shown. This construction is similar to that of a pile condenser in which the condenser plates comprise the transparent electrodes 37 which are interleaved with the crystal plates 36*a*, 36*b*, 36*c*, etc. By reversing the direction of the electric field within adjacent crystal plates, as indicated by the arrows, it is possible to obtain a much lower operating voltage than that required in Figure 2. Thus, for example, with the four crystal plates per section shown in Figure 4 in place of the single crystal plate per section 23a, 23b, shown in Figure 2, the operating voltage is ¼ that shown in Figure 2, i. e., the device shown in Figure 4 will operate on a pulse scan voltage of 750 volts, and a modulation voltage running between 0 and 750 volts.

Referring again to Figures 6 and 7, 38 and 39 indicate horizontal (X) and vertical (Y) pulsers respectively. The operating requirements of these pulsers 38, 39 are periodically to produce a rectangular pulse, having an amplitude of the order of 3000 volts and a duration of approximately $\frac{1}{10}$ to $\frac{1}{20}$ micro-seconds. Pulsers such as are herein described are well known in the electronics art, having been used extensively in connection with radar devices. However, the present pulsers may be constructed to produce comparatively low powered pulses.

Referring to the (X) pulser 38, a pulse 40 is emitted at the commencement of each (X) scanning cycle. The pulser 38 is periodically keyed to effect this result by the application of the horizontal television synchronization signals across terminals 41.

In order to cause the pulse 40 to scan the screen in a horizontal direction, i. e., along the (X) scanning direction of the screen, there is provided a delay line 42. This delay line 42 comprises a dissipationless, lumped constant line, which is terminated in the characteristic resistance of the line $Zox$. Such a line is shown in Figure 6 as being constructed from a plurality of capacitors 43a, 43b, 43c, etc., and inductor elements 44a, 44b, 44c, etc. The jth element of the delay line 42 is the capacitor 43j and the inductor 44j. The pulse 40 travels down the delay line 42 with a constant velocity which is dependent upon the value of the inductors 44 and capacitors 43 comprising the lumped constants.

The confines of the screen 29 are shown in dashed lines in Figure 6 as within the area defined by the transparent electrode 25, to which the signal voltage 58 is applied, said voltage having a negative amplitude. Between the electrode 25 and the vertical conducting strips 30a, 30b, . . . 30j, etc. there is positioned an electro-optic responsive shutter 23, such as is shown in Figures 1–4. If the shutter arrangement shown in Figure 2 is employed, the requisite pulse amplitude is approximately 3000 volts. If the arrangement shown in Figure 4 is used the pulse amplitude may be a fraction of this, as for example, 750 volts.

In operation, the voltage pulse 40, having arrived at the jth element, is applied between the resistor 46j connecting through the strip 30j to the resistor 47j to the common transparent electrode 25. The common electrode 25 is connected to the picture signal amplifier 48 which applies a negative amplitude 58 to the electrode 25. Thus the potential between the strip 30j and the common electrode 25 is the additive resultant voltage of the positive pulse and the negative picture signal. This potential appears as a potential difference across the electro-optic responsive element 23 between the said strip 30j and the common electrode 25. The capacitor 49j is rapidly charged to and retains this potential difference, said potential difference decaying at such a rate as to provide a persistence effect between successive scanning operations, hereinafter described.

The potential difference above referred to activates and opens the jth strip of the electro-optic shutter 23 which extends across the entire screen. However, since only strip j is subjected to the electrical voltage pulse at this particular instant, only this strip will be able to transmit light and this light will be transmitted in proportion to the signal amplitude.

The source of light of the screen shown in Figure 6 comprises a bank of fluorescent flash tubes 50. These tubes are flashed in succession by means of the traveling electric pulse produced by the Y scanning device 39. Since the duration of the light flash is on the order of 90 microseconds, the traveling light flash of the scanning beam will chiefly be utilized along one scanning dimension, thereby reducing the overall luminous power required.

The total intensity requirements for the source light 50 may be considerably reduced by introducing the above referred to persistence effect to the particular voltage applied to the transparent electrode strip 30j. This persistence effect is accomplished by applying the voltage through a rectifier element 51j which may comprise any suitable rectifier element, such as a diode, a copper oxide rectifier, or a germanium type rectifier. In addition to the rectifier element 51j, a capacitor 49j is shunted across the resistor 47j. This capacitor 49j is also understood to include the capacitative effect of the strip 30j to common electrode 25. When the combined electric voltage pulse 40 plus the signal voltage 58 is applied to the jth circuit, the capacitor 49j is rapidly charged to a voltage proportional to the applied pulse, plus the picture signal voltage 58 in series with the applied pulse. When the pulse 40 has passed along beyond the jth terminal of the delay line 42, the capacitor 49j maintains the potential difference between element 30j and electrode 25; the said combined voltage decreasing at an exponential time rate, depending on the RC value of the resistor 47j and the capacitor 49j only. The rectifier 51j may be considered to have a substantially infinite resistance for the reverse potential difference across it after the passage of the pulse 40.

Since the delay line 42 is composed of physically realizable components, and these have a certain amount of resistance which comprise various losses, there is a resultant decrease of the voltage amplitude of pulse 40 as the pulse travels from the pulser 38 to the end of the line which is terminated in its characteristic resistance $Zox$. Inasmuch as it is necessary for the elements 30a, 30b, 30c, . . . 30j, etc., to be operated at a constant pulse voltage, the resistors 46a, 46b, . . . 46j are of decreasing value from the start of the line to the end, respectively. As a result, the high initial voltage of pulse 40 will then be attenuated to a considerably lower level upon the electrode strip 30a and will be attenuated somewhat less to the same level on electrode 30j, so that a constant voltage pulse will scan across the screen from 30a through 30j, etc.

Figure 8:
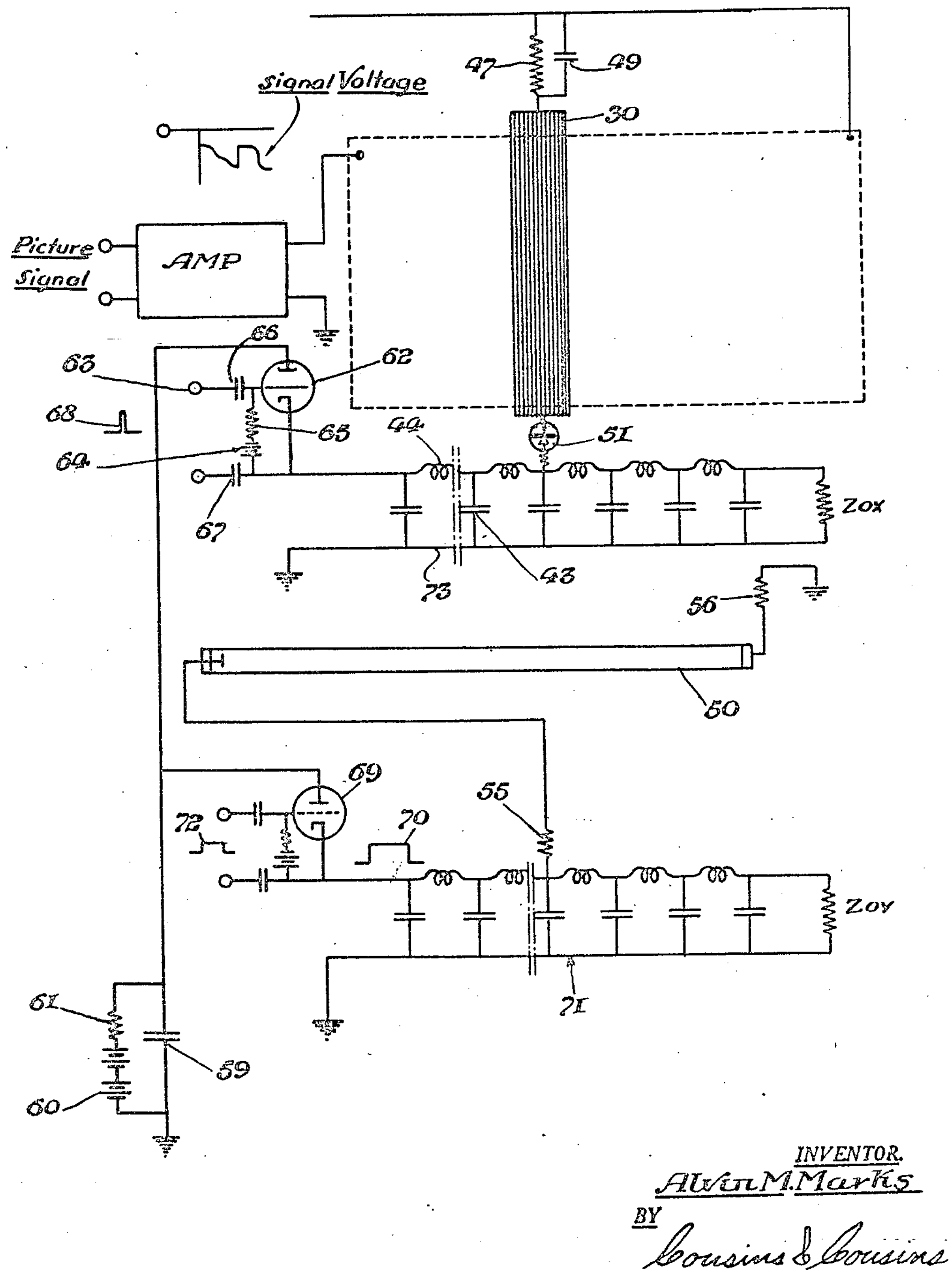
Figure 8 is a schematic view of a composite or single pulser unit for actuating the vertical and horizontal delay lines.

The prior description has dealt only with the X scan. The following will be directed toward the Y scanning line 52. While a separate pulser 39 is shown in Figure 6 for the Y scan, it will be understood that the X pulser 38 and the Y pulser may be combined into a single pulser unit by providing a suitable switching circuit interposed between the lines 42 and 52, so that the line 42 will be used for a succession of scanning pulses for the X scanning line during one frame, and then a single longer pulse will be switched to the line 52 to operate the Y scanning sequence at the commencement of each frame. This switching circuit is shown in Figure 8. The operation of said switching circuit may be controlled by the conventional horizontal and vertical television synchronizing signals.

As shown in Figure 6, the Y pulser 39 is operated from the vertical synchronization signal supplied to the terminal 53, and emits a long pulse 54 which travels down the line 52 to the terminal resistor *Zoy*. The time required for the pulse 54 to travel down the line 52 is exactly the time required for one frame, namely 1/30 of a second (or 1/60 of a second in interlaced scanning, not shown). In the particular modification of the invention shown in Figure 6, the different velocities of scanning required in connection with lines 42 and 52, are readily obtained by the choice of suitable values of the capacitors and inductors employed to form the line. The source light previously referred to, which is furnished by a succession of flash tubes 50*a*, 50*b*, 50*c*, etc., produces a traveling line of light which scans once vertically during each frame. The voltage applied to the flash tubes 50*a*, etc., is maintained constant by virtue of the proper value of the resistors 55*a*, 55*b*, etc. The value of these resistors decreases successively from the initial to the far end of the line, while the set of resistors at the other end of the tube 50, namely 56*a*, 56*b*, etc., may be maintained constant. All of the resistors 56 are connected to ground. The tube 50 may be of the flash tube variety or a photoflood speed light which may comprise, for example, a rare gas such as xenon or krypton. As previously stated, they may also be of the fluorescent light type containing a phosphor which can be flashed on and off, in a time approximating 100 micro-seconds.

At the start of the frame, pulser Y emits a pulse which causes the flash tubes 50*a*, 50*b*, . . . 50*k*, to be successively activated so that, for example, a line of light travels vertically in 1/30 of a second. During the interval in which flash tube 50*k*, for example, is illuminated, all other flash tubes are dark so that light is available for transmission through the screen only along the line 50*k*. At the instant that line 50*k* is illuminated, pulse 40 is emitted by X pulser 38 and travels along the line 42. When the pulse 40 has reached the *j*th strip, the shutter section immediately under the vertical line 30*j* is caused to operate. Consequently, only at the intersection of the line 30*j* and the flash tube 50*k* is a light pulse permitted to travel through the screen 29. This is the light which constitutes the elementary scanning area 57*jk* at the intersection of the horizontal and vertical lines.

In addition to the pulse 40, there is the picture signal voltage 58, which constitutes the modulating voltage for the scanning elements 57. As the pulse voltage 40 scans along a horizontal line, the picture signal voltage 58 varies in accordance with the impressed signal modulation amplitude 33. In this manner, the entire screen area 29, shown in Figure 6 within the dashed lines, is scanned, and the elementary areas 57 are suitably intensity modulated to reproduce the picture being televised.

Referring to Figure 8, there is shown a circuit whereby the X and Y lines may be pulsed from the same pulser circuit. It will be noted in this connection that the X pulse has a duration equal to the length of time required to scan one elementary area in the X direction. This time is 1/10 to 1/4 micro-second. Such a pulse can be readily generated with the conventional type of radar pulsers. Pulser Y, however, must emit a pulse having a duration equal to the length of time required to scan a complete line in the X direction. This pulse is of the order of 90 micro-seconds. A single pulser which will serve for both the X and Y directions can be produced by the use of the so-called "hard tube" pulsers. The hard tube pulser circuit produces a pulse whose duration is controlled by the synchronizing or keying signals. Such hard tube pulser circuits may employ as switch tubes the hydrogen thyratron powered by a capacitor having a sufficiently large value to store energy for the longest pulse required.

In the present instance, since two different lines are pulsed in the manner above indicated, it will be necessary to employ two hydrogen thyratrons fed from a single storage capacitor of large value. The large storage condenser 59 is fed by the voltage source 60 through the isolating resistor 61. The hydrogen thyratron 62 is keyed through terminals 63 with a keying pulse 68 whose duration is equal to that of the output pulse 40. The grid of the tube 62 is maintained below cut-off by the biasing battery 64 through the isolating resistor 65. Capacitors 66 and 67 are utilized to transmit the keying pulse 68, at the same time isolating the elements of the tube 62 from the pulse 68. Similarly, hydrogen thyratron 69 is utilized to supply the pulse 70 to the line 71. The keying pulse 72 has a duration equal to that of the output pulse 70. The storage capacitor 59 thus supplies both circuits 71 and 73 with pulses of different duration and in the proper succession.

The operation of the screen shown in Figure 6 is dependent upon the non-linear characteristic of the optical shutter element. It was previously shown that in order to obtain a satisfactory contrast ratio, a 2 or 3 section shutter must be employed having a suitable non-linear characteristic such as is shown in Figure 5. It would be preferable, however, to employ a single section shutter thus making for simpler construction and greater light transmission.

In order to do this, a non-linear characteristic may be produced electrically. Specific examples of means to produce these characteristics are described in connection with Figures 9 and 10. It may be desirable to reduce the operating voltage of the single section shutter by employing the interleaved construction shown in Figure 4.

In both Figures 9 and 10, similar parts have been given the same numbers, as in Figure 6, except as hereinafter indicated.

Figure 9:
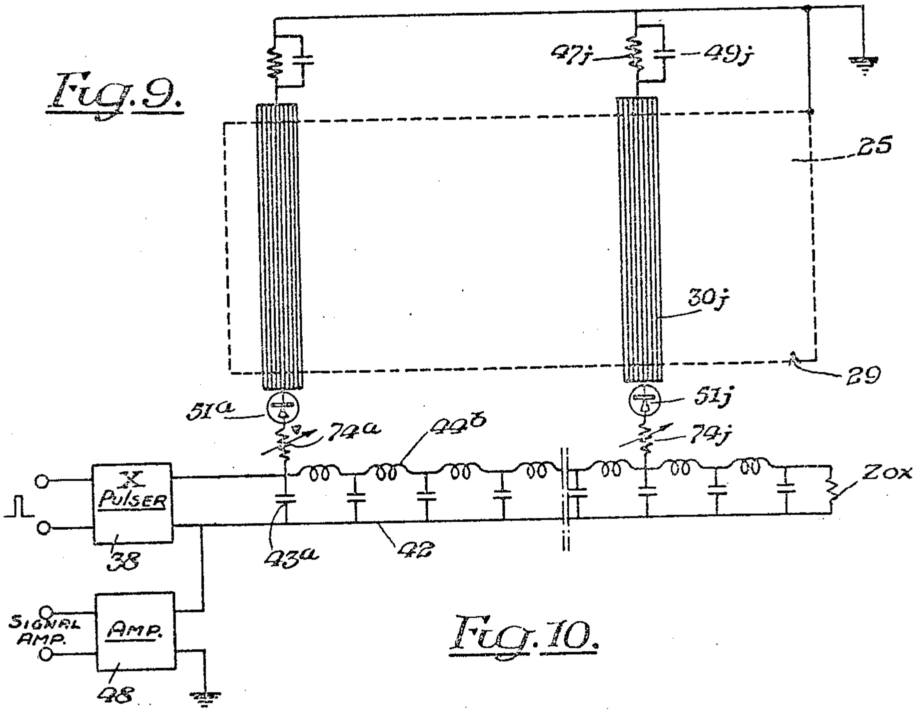
Figure 9 is a schematic view of a novel scanning and modulating circuit employing non-linear elements.

Referring to Figure 9, the element 74*j* is a thyrite non-linear resistor in the *j*th conducting strip along the screen 29. As an example, the characteristic of the thyrite resistor may be given by the formula:

$$i = Kv^n$$

where $$K = 1.1 \times 10^{-25}$$
$$n = 6$$

where $i$=current in amperes; $v$=voltage across the thyrite resistor; $K$=a constant of proportionality; $n$=the exponential constant. From this formula, it follows that a voltage across the resistor 74*j* must be greater than a certain critical voltage, of the order of the pulse voltage, for the resistance thereof to be less than substantially infinite.

When the voltage does not exceed the pulse voltage or the signal voltage, the current $i$ in the $j$th element is very small and the potential of the $j$th element relative to the common ground element 25 is low. As a result, the light shutter is substantially opaque. However, when a signal amplitude and a pulse voltage are simultaneously applied across the $j$th element, it causes a substantial voltage drop across the resistor 74$j$ which now transmits considerable current, thereby increasing the potential of the $j$th element relative to the grounded element 25. The rapid drop in the resistance of 74$j$ as the total of the signal and pulse voltages exceeds the critical voltage causes almost all the additional signal volt age to appear across the resistor 47$j$, and the condenser 49$j$. As before, when the pulse has traveled beyond the element 30$j$, the rectifier element 51$j$ ceases to become conductive, and the voltage amplitude is momentarily retained by the condenser 49$j$ until it leaks off through the resistor 47$j$. This action will occur within the length of time corresponding to that which is required to scan one line. After the pulse has passed beyond the strip 30$j$, the signal amplitude, which is still impressed across the said strip, is substantially taken up in voltage drop across the now high resistance 74$j$. Consequently, when the pulse is not at the $j$th element the signal amplitude present has relatively little effect in producing an operating voltage on the strip 30$j$ and the light shutter between the strip 30$j$ and the common electrode 25 is then substantially opaque.

Figure 10:
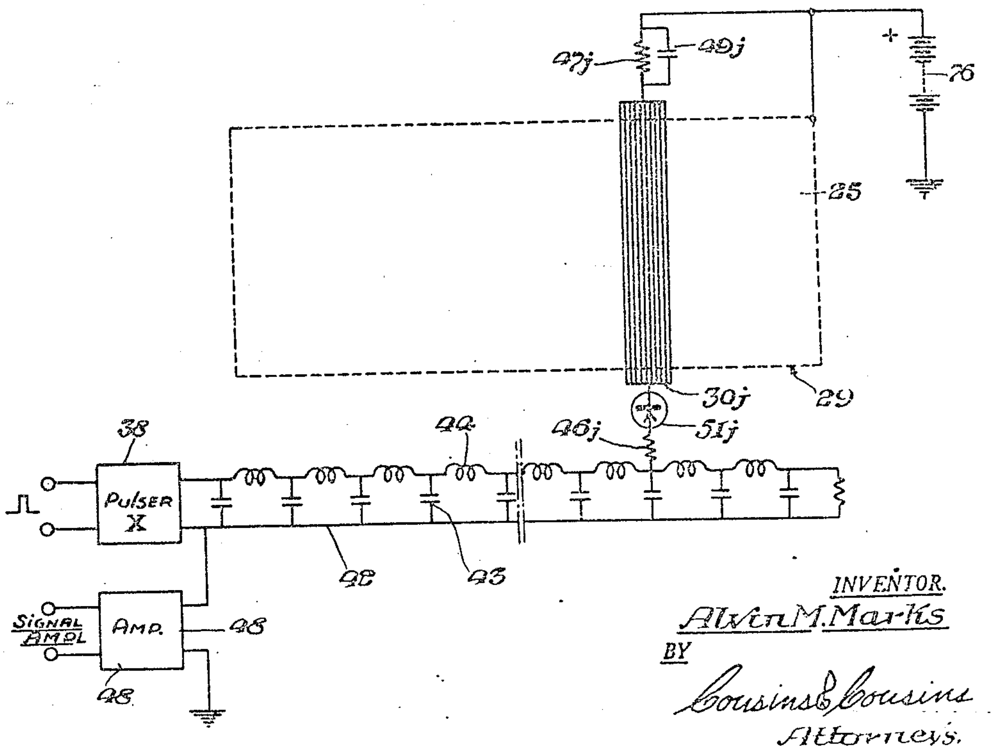
Figure 10 is a schematic view of a novel scanning and modulating circuit employing rectifier elements.

In Figure 10 there is shown another method of scanning and modulating a screen 29. In this embodiment both the common screen element 25 and the $j$th element of the screen are ordinarily maintained at the positive bias of the voltage source 76. This positive bias may be of the order of the amplitude of the pulse voltage. The strip 30$j$ is maintained at the same voltage as the common screen element 25, so that there is no potential difference between these two elements under ordinary circumstances. The rectifier 51$j$ practically isolates the strip 30$j$ from the pulser 38 and the signal amplifier 48 under ordinary circumstances.

However, when a combined voltage of the pulser 38 and the signal amplitude is applied, a signal appears momentarily across the $j$th element. The voltage on the terminal of the resistor 46$j$ at this instant exceeds the voltage source 76. The rectifier 51$j$ therefore becomes conductive and a current passes through the strip 30$j$. This current is proportional to the signal amplitude. Thereupon, the voltage drops, across the resistor 47$j$ and the capacitor 49$j$, to establish a potential difference E between the strip 30$j$ and the common electrode 25 which is proportional to the signal amplitude present. However, after the pulse has passed beyond the strip 30$j$ the voltage upon the rectifier 51$j$ is that of the signal amplitude only, which is insufficient to overcome the positive bias of the rectifier element. It will thus be seen that the signal amplitude can only affect the $j$th strip momentarily, while the pulse is also being applied.

The effect of persistence, produced by the resistor 47$j$ and the capacitor 49$j$, depends upon the signal voltage momentarily impressed thereon. The charge given to the capacitor 49$j$ during the picture modulation then persists after the pulse has passed, since the voltage applied to the capacitor 49$j$ is proportional to the signal voltage at that instance.

The previous discussion has shown how the novel scanning principles herein disclosed may be applied to actuate electro-optic shutters, particularly those employing the parallel electro-optic effect. However, the scanning principles herein disclosed have broader applications, and may be employed in a novel cathode ray phosphor type screen. This screen may utilize, for example, the electrodeless discharge, hereinafter described in connection with Figure 11.

It is well known that an electrodeless discharge may be started by means of electrodes applied externally to an enclosure containing a suitable gas at optimum pressure. The electrodeless discharge may be of the impulse type, comprising a short, but rapid avalanche of electrons caused to form within the gaseous enclosure between the electrodes by the application of a sudden high potential. The electrodeless discharge may also be of the continuous type which may be produced by an alternating current having an optimum frequency and amplitude for the efficient production of such electrodeless discharges.

An electrodeless discharge may be maintained in the gas hydrogen by the application of approximately 70 megacycles at a pressure of approximately 3 mm. of mercury, and a voltage amplitude of the order of 250 volts.

In Figure 11 there is shown the top view section of a screen employing the cathode ray electrodeless tube 77. This tube 77 comprises a screen of large area and shallow depth actuated by suitable delay lines 84, 93, in conjunction with a cross-grating electrode screen 85$a$, 85$b$, $j$, and 100$a$, 100$b$, 100$c$, $j$. The front inner surface of the cathode ray tube 77 is coated with phosphor 79. The tube 77 is shown in front elevation in Figure 12, in which figure only two of the actuating strips appear. These strips comprise the horizontal electrode 85$k$ and the vertical strip 100$j$. These strips intersect in the area $jk$.

In the modification of this invention shown in Figure 11, the cathode ray tube 77 is divided into two sections by an electrode 78 comprising a mesh screen. The space 81 between the electrode 78 and the rear of the tube 77 comprises the ionizing section. The space 81′ between the electrode 78 and the phosphor 79 comprises the acceleration section of the screen.

The manner in which this device operates may be seen from the circuit shown in Figure 11. The Y pulser 82 is actuated by the vertical television signal and puts out a negative pulse 83, which travels down the delay line 84. This pulse 83, in turn, successively actuates the horizontal electrode strips 85$a$, 85$b$, 85$c$, etc.. The method of actuation may be understood by reference to the voltage time diagram 86 associated with Figure 11. The 78 and the strip 85$k$ are maintained at a negative potential by means of the voltage source 95. Since normally the grid 78 and the strip 85$k$ are at the same potential, no ionization will occur in the space 81. However, when the pulse 83 is momentarily applied to the electrode strip 85$k$, the said strip suddenly becomes considerably more negative in potential than the grid 78. In addition, the strip 85$k$ has impressed thereon a high frequency electrical oscillation 88 which may be of the order of 70 megacycles. This high frequency oscillation 88 is produced by the ringing circuit, comprising the inductor 89k, the capacitor 90k and the resistance element 91k. The constants of these elements are adjusted to give the oscillation 88 having an amplitude $E_2$ and being attenuated at a suitable rate by means of the resistor 91k. Alternately, the high frequency oscillation 88 may be applied extraneously to the delay line 84 by placing an oscillator in series therewith in a manner similar to that shown in Figure 6, as in the case of the signal amplifier 92 in series with the line 93. In such case, the operation as far as the strip 85k is concerned is the same.

The rectifier element 94k assures that little or no high frequency voltage will be supplied to the strip 85k when the pulse 83 has passed beyond the strip 85k. This may be seen in the voltage diagram 86. When the pulse voltage reaches the kth strip, the high frequency oscillation is lifted to a lower negative potential and then appears across the electrode strip 85k. This negative potential is considerably less than $E_3$, the biasing voltage 95. When the pulse 83 has passed beyond the kth strip, the high frequency oscillation 88 drops below the biasing voltage $E_3$, and thus can not appear across the electrode strip 85k. The amplitude of the high frequency oscillator, $E_2$, is sufficient to cause an intense ionization in the space 81. This ionization is ordinarily confined to the space 81 by the grid 78.

Figures 12, 13, 13A, 14, 15, 16:
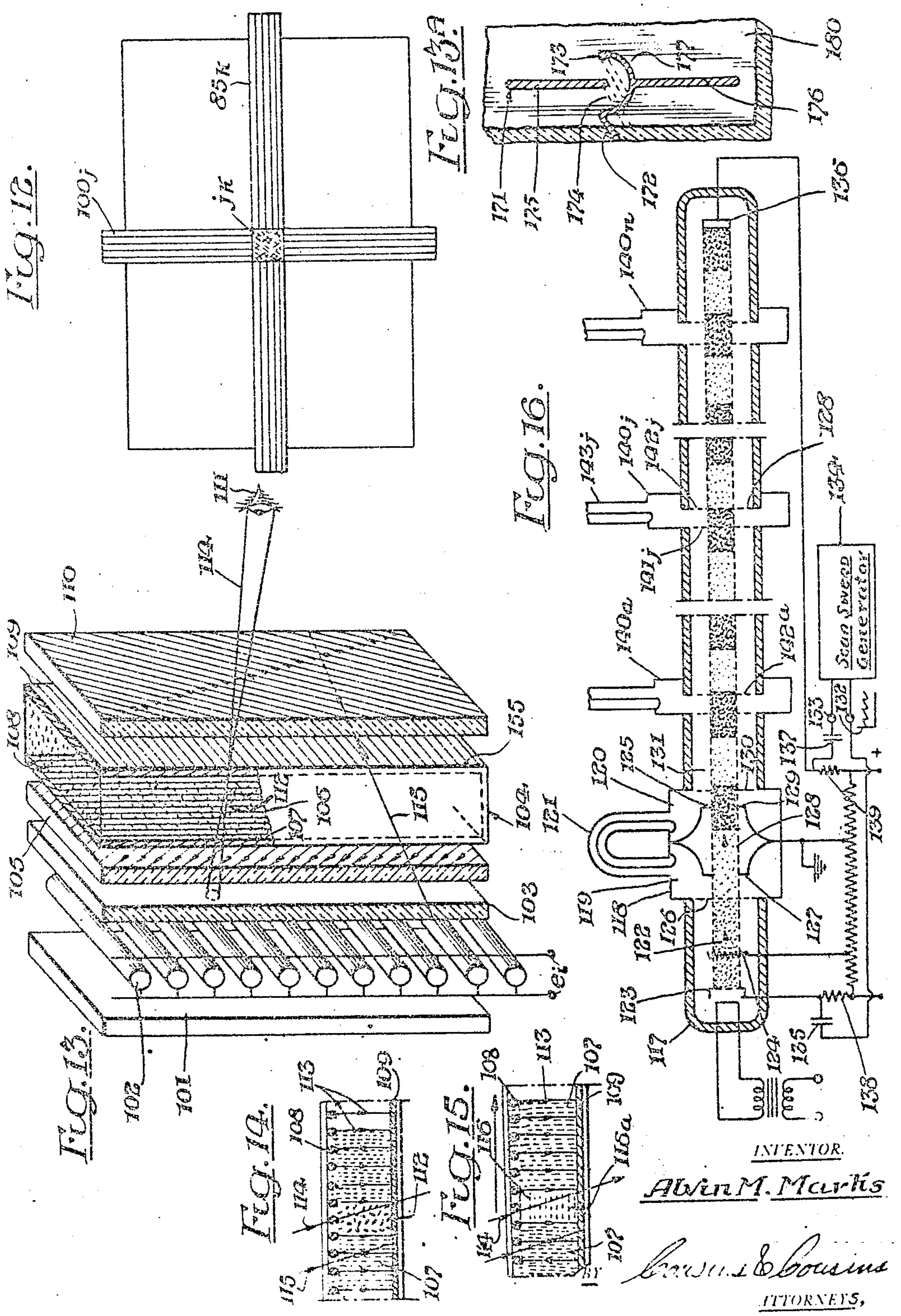
Figure 12 is a fragmentary view in front elevation of the screen shown in Figure 11.
Figure 13 is a diagrammatic view in perspective of another embodiment of the present invention.
Figure 13A is a novel dipole terminating a three wire microwave transmission line as applied to the screen shown in Figure 17.
Figure 14 is a fragmentary view of a portion of the screen showing the disorientation of dipole particles.
Figure 15 is a fragmentary view of a portion of the screen showing the realignment of the dipole particles.
Figure 16 is a sectional view along the axis of a frequency scanning tube, according to this invention.

Assume now that a high positive voltage has suddenly been applied to the vertical electrode strip 100j, shown in Figure 12, and the ionization has occurred in a strip parallel to the electrode 85k, as indicated by the dotted area 81 in Figure 12. The ionized gas thus produced contains highly mobile free electrons in addition to slowly moving positive ions. The free electrons will be attracted only to the elementary area jk when the high positive voltage is applied to electrode strip 100j.

The manner of operation of the X pulser picture modulation circuit shown in Figure 11 may be understood from the following: The X pulser unit 97 causes the pulse 98, of the voltage amplitude $+E_5$, to periodically traverse the line 93. Considering the picture signal amplitude 92 as zero momentarily, and considering the negative bias supplied by the potential source 99 as being $-E_5$, all the electrode strips 100a, 100b, etc. will be maintained at a negative potential relative to the ion space 81 and consequently will be unable to attract electrons from the ion space 81 to the phosphor 79. However, at the strip 100j when the pulse 98 is momentarily present, the positive voltage of the pulse $+E_5$, added to the negative bias potential $-E_5$ raises the potential of the electrode strip 100j to zero relative to the ion space 81; at which point the condition is such that additional positive voltage applied by the picture signal amplifier 92 will cause electrons 181 to impinge upon the phosphor 79 only at the elementary area jk, such electron stream causing an illumination proportional to the instantaneous picture signal amplitude. Electrons 181 impinging upon the phosphor 79 scatter and eventually find their way back to the space 81 by a variety of paths (shown in dotted lines within the space 81') and thus maintain the electrical balance.

Since the pulse 98 is caused to travel down the line 93, the vertical elements comprising the screen are actuated in succession and the screen is horizontally scanned. At the same time, the screen 77 is vertically scanned by the pulse 83, which of course, travels at a much lower velocity. In this manner the entire screen is scanned and modulated.

It is clear that the essential features of the shallow cathode ray screen 77 comprise a strip source of ionization in the space 81 and means for pulse-scanning and modulating the said ionized strip into elementary areas by means of cross-grating electrodes 85, 100. It will be understood that various forms of ionization may be employed and that this invention is not limited to electrodeless sources of ionization. Thus, for example, the electrode strip 85k could be enclosed within the tube 77 and might comprise suitable electron emitting surfaces having a low work potential such as a caesium or an amalgam surface containing an alkali metal.

Another form of screen according to this invention is shown schematically in Figure 13. A light reflecting surface 101 is positioned behind the screen proper. Immediately in front of the reflector 101 are a plurality of high intensity illuminants 102. These illuminants 102 are capable of substantially instantaneous variation in accordance with an intensity signal voltage $e_1$. Illuminants such as have been previously described in connection with Figures 6 and 7 are satisfactory for this purpose. The light from the illuminants 102 is converted into a uniform field by a diffusing plate 103 which is placed between the illuminants 102 and the screen 104. The diffused light emanating from the plate 103 is polarized by a suitable polarizing sheet 105 before it enters the screen 104.

The body of this form of screen is in the shape of a thin rectangular transparent tank 155. Within the tank 155 there may be contained a liquid 106. The liquid 106 contains suitable transparent birefringent elongated dipole particles 107. The length of these particles 107 is critical.

A maximum dipole particle length is desired to increase the dipole moment, to enable easy alignment by means of weak electric fields. The birefringent effect, moreover, is increased in the thicker and longer particles 107. On the other hand, the particle length must not exceed a given size, since the relaxation time must be sufficiently small to provide an adequate response to the control signals. Moreover, the width of the particles must not be great enough to cause substantial light scattering when the light is passing approximately parallel to the axis of the aligned particles 107.

Such requirements are met by collodial suspensions of anisotropic, birefringent, elongated, dipole particles of substances which have an inherently large dipole moment. These collodial particles may preferably be suspensions of crystallites in a suitable liquid. The crystallites may be obtained from a widely dispersed class of organic or inorganic chemical compounds; for example, meconic acid, quinine sulphate, certain protein crystallites, quartz, etc. In addition to collodial suspensions of transparent berefringent crystallite dipole particles, the liquid 106 may comprise a dilute solution, in any suitable solvent such as water, alcohol, etc. of a substance having an elongated molecular structure. This substance must also have a large electric dipole moment and a birefringent effect, when a plurality of its molecules are suitably aligned in an electric or magnetic field. Such substances include the class known to form "liquid crystals" in molten, or concentrated solution, and which may exist in the smectic or nematic state. An example of a substance belonging to the class of liquid crystals, is p-azoxyanisol. Many other such well known substances may be alternatively employed.

The front and rear inner surfaces of the screen 104 are latticed by a plurality of wires 108, 109, which comprise two distinct series of gratings. The rear grating 108 is formed of spaced vertical wires. The front grating 109 is formed of spaced horizontal wires. The wires which are formed into the gratings 108, 109 are small in diameter compared to the distance therebetween, and consequently will cause a minimum of interference with the passage of light through the screen 104. The cutaway section shown in Figure 13 is therefore exaggerated as to the relative size of the wires and width of the tank 155, for the purpose of clarity of illustration.

A polarizing sheet 110 is placed in front of the screen 104. The plane of polarization of the sheet 110 is at right angles to that of the opposed polarizer 103 located behind the screen 104. In this manner, all the light which enters the screen 104 from the illuminants 102 is ordinarily absorbed by the second of the cross-polarizers 110; hence the observer 111 sees only a dark screen. However, light passing through region 112 is rotated or depolarized, as hereinafter described, and is thus enabled to pass through the second polarizer 110. The intensity of the light passing through the region 112 is modulated by the intensity signal voltage $e_1$ applied to the bank of illuminants 102.

The scanning signals, which determine the coordinates (X, Y) for locating the given region of light 112, are fed into the electrical circuits connected to the gratings 108, 109. A preferred means by which this is accomplished is described below in connection with Figures 16 and 17, which show a frequency scanning means. Alternatively, the wires comprising the gratings 108, 109 may be connected to an array of contactors on a cathode ray or ion gun selector tube through appropriate vacuum tube circuits (not shown). Thus, in a small region 112, between the two gratings 108, 109, a region of zero electrical field is located, defined there by the X and Y scanning signals.

The above mentioned birefringent particles ordinarily may be aligned normal to the plane of the gratings 108, 109 by an electrical field 113 applied between the said gratings (see Figure 14). Under these conditions the polarized light 114 from the polarizer 105 (the plane of polarization of which may be at 45° to the horizontal) traverses a path approximately parallel to the long (optic) axis of the particles 107 except in passing through the region 112. Thus there will be no relative retardation between the horizontal and the vertical components, or depolarization of the polarized light 114 except in passing through the region 112.

However, since the electrical field may be zero within the region 112, which is located in the vicinity of the scanned X and Y coordinates, the particles 107 within the region 112 will quickly become disoriented. Some of the disoriented birefringent particles will have the effect of randomly rotating the plane of polarization, and hence of depolarizing the light. The result of a rotation or depolarization of the divergent rays of light 114, in passing through region 112 is to enable a substantial portion of the rays 114 to pass through the second polarizer 110; whereas, other light rays 115 from elsewhere within the screen are blocked by the polarizer 110.

Thus, a modulated spot of light at region 112 will appear to be located at the intersection of the coordinates X and Y scan within the screen 104, said spot having the intensity of the corresponding element of light on the object being televised.

The three signal voltages impressed upon the control elements scan the screen 104 and also control the intensity of light emanating from each region of zero electrical potential within the confines of the screen, thereby organizing an image in two dimensions.

Figure 15 is generally similar to Figure 14, except that the region of zero field 112 is replaced by field 116, which may be either electric or magnetic. The field 116 is, for example, directed horizontally and is parallel to the plane of the gratings 108, 109. The strength of the field 116 may be considerably less than that of the normal aligning electric field 113. The effect of this arangement is that the region of disorientation 112, referred to in connection with Figure 14, is replaced by a region 116a in which a secondary alignment of the particles 107 occurs, as shown in Figure 15. The secondary alignment of the dipole bi-refringent particles 107 is such that they are aligned with their optic axes at 45° to the planes of polarization of the polarizers 105, 110, and parallel to the planes of gratings 108, 109. If the concentration of dipole particles 107 is such as to cause a quarter-wave retardation between the vertical and horizontal components of the polarized light ray 114, the said rays will pass, in part through the polarizer 110. However, the components of rays 115, which are not relatively retarded, are absorbed by the polarizer 110, as shown in Figure 13.

Figures 17, 18:
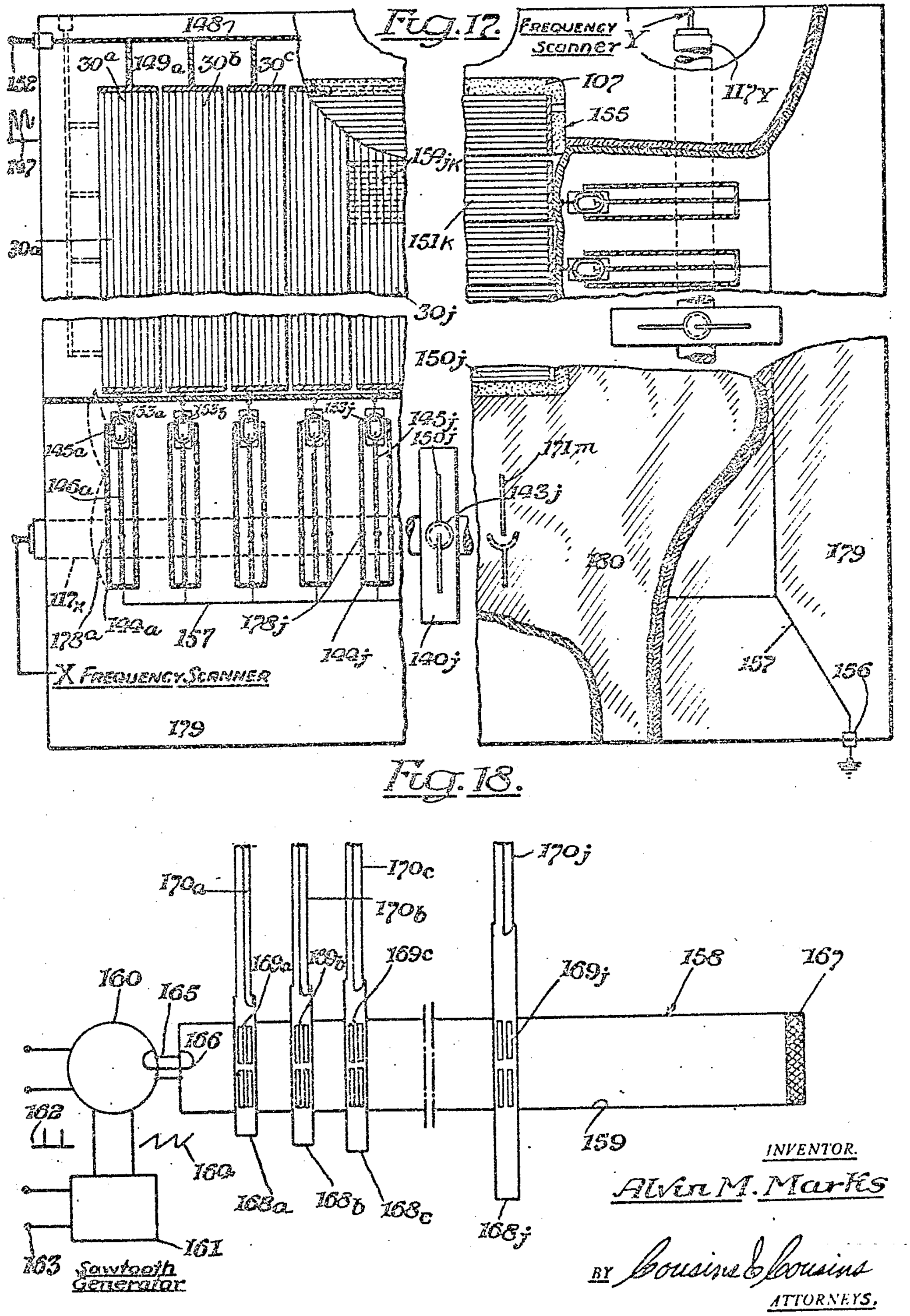
Figure 17 shows a fragmented view of a two-dimensional screen according to this invention with certain portions cut away to show the microwave control circuits thereon.
Figure 18 shows a section through a variable frequency microwave resonator tube, to be used in lieu of the variable frequency scanner of Figure 16.

A preferred system of scanning the screen shown in Figure 13 is illustrated in Figures 16 and 17. This system, hereinafter referred to as frequency scanning, employs two saw-tooth frequency variations which are applied along the X and Y axes of the screen, respectively. Referring to Figure 16, there is shown a multiple resonator tube 117, which is derived from the klystron. This tube comprises the basis of the frequency scanning system. The oscillator section 118 of the multiple resonator tube 117 may be the conventional klystron type shown in Figure 16, employing two cavities 119 and 120 and a feedback coaxial line 121.

An electron beam 122 proceeds from the cathode 123 under the influence of the electric field between the anode 124 and the cathode 123. Electron beam 122 is bunched as at 125 in the well known manner by the high frequency field between the grids 126, 127 of the cavity 119, as it travels through the drift space 128. The electron beam 122 traveling through the drift space 128 arrives 180° out of phase at the grids 129, 130 of the cavity 119, and thereby sustains the oscillations by supplying power to the high frequency field in the cavities 118 and 119. Thus there arrives at the entrance 131 to the multiple resonator tube 177 a bunched electron beam 125, which periodically varies in electron density, as indicated by the group of dots shown in Figure 16.

In order to modulate the frequency, certain factors may be varied such as, beam current, acceleration voltage or output load. A preferred means of modulating the frequency by varying the current of the electron beam 122, is shown in Figure 16. This variation is accomplished by means of an auxiliary saw-tooth voltage 132 supplied at terminals 133 by the scan sweep generator 134. This voltage is applied through capacitor 135 to the cathode 123 and to the collector anode 136 through the capacitor 137. Isolating resistors are shown at 138 and 139. In this manner the electron density of the electron bunches may be periodically varied so that the time frequency graph possesses a saw-tooth variation.

A plurality of cavities 140a and 140b, etc., are arranged along the multiple resonator tube 117. The cavity 140j, shown in Figure 16, is hereinafter referred to particularly. This cavity 140j has a radius $a_j$, and grids 141j and 142j. It is well known that cavities of this type possess an extremely high "Q"; i. e., are very sharply tuned to a precise wave length. One dominant resonant mode may be expressed by the formula $\lambda_j=2.61a_j$, where $a_j$ is the radius of the cavity in centimeters of the $j$th cavity and $\lambda_j$ is the wave length in centimeters.

Since the "Q" may be of the order of 10,000 to 30,000, a very small change in radius is sufficient to detune the cavity. Accordingly, the multiple resonator tube 117, shown in Figure 16, comprises a series of cavities 140a, 140b, etc., the radius of which may increase gradually from the front to the rear of the tube 117. This construction operates to produce a series of individually tuned cavities each of which is sharply tuned to a slightly longer wave length than the one preceding it. This wave length variation is preferably linear. Thus, as the frequency with which the electron bunches 125 pass a given point is linearly increased by the applied saw-tooth voltage 132, the cavities 140a, 140b, etc., are successively caused to resonate along the multiple resonator tube 117.

The cavity 140j, referred to specifically above, has the output coaxial line 143j which carries the high frequency energy produced within the said cavity. The high frequency energy thus produced is led from the cavity 140j to its particular portion of the grid within the screen. In this manner the resonating element is employed to energize a coordinate element of the said screen or deenergize it at a particular instant in the scanning operation. The energy may be fed successively from the cavities 140a, 140b, etc., directly along the coaxial lines 143a, 143b, etc., to the screen 104.

The means have now been provided for converting a saw-tooth frequency variation into a device for scanning along a space coordinate. It follows, therefore, that by providing two systems such as are shown in Figure 17, a two-dimensional area may be scanned, and any element of area therein instantaneously located. Appropriate saw-tooth frequency variation must be applied in synchronization to systematically scan in two dimensions.

Referring to Figure 17, there is shown a front view cutaway section of the frequency scanning device as applied to the actuation of the vertical strip electrodes 30a, 30b, 30c, . . . 30j, through the agency of the X frequency scanner and the multi-resonator tube 117X. Also similar actuation means for the horizontal strip electrodes 151a, 151b . . . 151k, are shown for the Y frequency scanner 117Y. The portion of the screen comprising the shallow, rectangular tank 155, containing the dipoles 107 is also shown, the dipoles 107 being indicated as dots around the extremities of the tank 155 in the cutaway section.

The coaxial feeder line 143j is shown terminating in the dipole antennae 150j. Antennae 150a, 150b . . . 150j, are arranged in close proximity to the rear of the screen 104, closely adjacent corresponding antennae 171, which pick up energy radiated from the said antennae 150, and transmit said energy through a three wire mirco-wave circuit 172, 173, 174, terminating at the quarter-wave point 178 of the three-quarter wave lines 144 inscribed on the front face 179 of the screen.

In Figure 13A there is shown a dipole termination 171 for a three wire micro-wave line. This dipole 171 may be inscribed into the surface of an insulating medium such as polystyrene or glass. The three wire line, 172, 173, being the outer wires thereof, and 174 the central wire, is shown communicating with the dipole 171 through the glass sheet 180 normal to the face thereof. The outer wires 172, 173 of the three wire micro-wave line, are joined by the inscribed connecting strip 177 which also joins with the lower portion of the dipole antenna 176. The upper portion 175 of the dipole antenna 171 connects with the central wire 174 of the micro-wave three wire line. The dipole 171 is placed in the near zone in close proximity to the corresponding dipole 150, and so picks up a substantial amount of energy only from the said dipole. Where necessary, additional shielding can be employed to prevent energy leakage to adjacent dipole systems. The advantage of the system shown is that numerous dipoles such as 171 can be inscribed or printed on a flat surface and are thus affixed permanently. Also, the necessity for a multitude of connections, between the multiple resonator tube and the screen elements, is avoided by the plurality of space couplings provided by the corresponding antennae 150 and 175.

The three-quarter wave lines 144a, 144b, . . . 144k, generate standing waves 166a, 166b, etc., in response to the micro-wave energy applied at the quarter wave point 178. The effect of this is to cause a maximum voltage to appear across the open ends of the lines 145a, 145b . . . 145j, and at the same time to cause nodes of zero voltage to be present at the closed end of the line 144a. Since zero voltage exists across the closed ends of the three-quarter wave lines 144, all of these may be connected as shown and grounded at 156 by means of the common connecting wire 157.

The operation to this point may be understood by reference to Figure 16, considering that the saw-tooth voltage 132 is increasing linearly, and the micro-wave excitation proceeds from cavity 140a to cavity 140b; eventually reaching cavity 140j and then passing finally to cavity 140n. The micro-wave energy momentarily being produced at the cavity 140j, is piped through the coaxial line 143j and radiated from the antennae 153j; this radiation being picked up by the closely adjacent antennae 150j, inscribed on the back plate of the screen 104. This energy is thus caused to excite the three-quarter wave line 144j, and thus activates a high frequency electric field with a maximum voltage across the open end of line 145j. Thus, in succession, a high frequency voltage appears momentarily at the open end of lines 145a; then 145b, and eventually at 145j, which has been described as momentarily under excitation.

The following description is directed to the means by which the micro-wave energy thus appearing across the open end of the three-quarter wave lines 144 is caused to change the potential of the electrode strips 30a, 30b, . . . 30j. All of the said electrode strips 30 (Figure 17) are connected through resistors 149a, 149b . . . 149j, to the common lead 149, terminating in contact 152. To the contact 152 is applied the pulsating D. C. voltage 147. The frequency of the pulsating voltage 147 is somewhat greater than the reciprocal of the time required to scan one vertical element 30. The strips 30 are connected in series with the diodes 153a, 153b, . . . 153j. The diodes 153 ordinarily have a high resistance. However, upon said diodes 153 being subjected to the high frequency electric field 147, said diodes 153 are caused to ionize and will thereupon readily transmit, offering a relatively low resistance to the passage of the electric current, so long as the voltage across said diodes 153 is maintained. However, since we have a pulsating voltage 147, the diodes 153 are periodically extinguished.

It follows, therefore, that as the micro-wave excitations travel from the three-quarter wave line 144a to the three-quarter wave line 144b, etc., they simultaneously cause conductive breakdown to occur in diode 153a, then in diode 153b, etc. Since the resistance 149a, for example, may be 10,000 ohms, and the resistance of diode 153b may be 10 megohms when non-conducting, and only 500 ohms when conducting, it may be seen that the electrode strip 30a may be maintained at a high potential at all times except when the diode 153a is conducting, at which time the said electrode strip 30a will be practically at ground potential.

Summarizing, then, the saw-tooth voltage 132 (of Figure 16) causes a micro-wave excitation to successively cause breakdown in the diodes 153. The electrical breakdown of the diodes 153 in turn causes a substantially zero potential to travel from electrode strip 30a to electrode strip 30b, etc., to 30k along the screen. In a similar manner the Y frequency scanner 117y causes the zero potential to sweep vertically from strip 151a to 151b, etc., to 151k.

It will thus be seen that at elementary area 154j, k, corresponding to the crossing point of the strips 151k, which is at zero potential momentarily; and strip 30j which is also at zero potential momentarily; and only at 154j, k will there be an elementary area having zero potential. All other elementary areas at other crossing points will be at either half or full potential difference.

Thus, only at 154j, k will substantial disorientation of the particles 107 occur, and only at 154j, k will substantial light transmission momentarily occur. In this manner the screen is scanned through the agency of X and Y micro-wave frequency scanners 117X, 117Y. Simultaneously with said scanning the background light is modulated, as above described to paint upon the screen a televised image.

Referring to Figure 18, there is shown another type of multi-resonator frequency scanner. This scanner comprises a multiple resonator tube 158, actuated by a wave guide 159. The micro-wave energy is generated by a variable frequency micro-wave source 160, such as a magnetron or klystron micro-wave generator, which is controlled by a saw-tooth generator 161. The saw-tooth generator 161 is controlled by the synchronizing signals 162 applied to terminals 163. The effect of the saw-tooth output 164 applied to the micro-wave generator 160 is to periodically increase the frequency of the micro-waves generated thereby, in accordance with the saw-tooth wave 164. The saw-tooth variable frequency micro-wave output of the micro-wave generator 160 is piped through the coaxial cable 165 which is terminated in the loop 166. The loop 166 couples the energy into the wave guide 159. Micro-wave energy thus travels down the wave guide 159 which is terminated in its characteristic resistance 167 which fully absorbs the micro-wave energy reaching the end of the line, thus preventing reflections and standing waves from being set up within the wave guide 159.

The wave guide 159 actually comprises a stack of resonant cavities 168a, 168b, . . . 168j, etc., with their axes coinciding with the long axis of the wave guide 159. The cavities 168a, 168b, etc. may be arranged external to the wave guide 159, with a communication between the wave guide and the cavity by means of perforations 169a, 169b, etc., in the walls of the said wave guide 159, to admit leakage micro-wave energy from the wave guide 159 to the said cavities 168.

The manner of operation of this scanning device will be understood with reference to the prior description of the multiple resonator tube shown in Figures 16 and 17; it being emphasized that in the present case variable frequency micro-waves 164 are externally produced and piped to all of the cavity elements simultaneously, with only that cavity, which is tuned to the frequency momentarily being generated, absorptively responsive to the said energy. Since the frequency varies in a saw-tooth manner, the cavities 168a, 168b, etc. will be excited in succession and thus produce a linear displacement of absorbed energy, which is piped along the feeder lines 170a, 170b, . . . 170j, etc. to electro-optic responsive elements on the screen in the previously described manner.

Having thus fully described the invention, what is claimed as new and desired to be secured by Letters Patent of the United States, is:

1. An apparatus for producing two-dimensional television images comprising, a screen member in the form of a sealed envelope of large viewing face area and shallow depth, said screen having an electrically conductive extended grid intermediate the front and rear inner surfaces of the envelope, a source of reference potential connected to the grid, a plurality of strip electron emitters upon the rear inner face of the envelope, connected through isolating resistors to the said reference potential, a plurality of accelerating conductor strips in front of said grid angularly disposed with respect to the orientation of the strip electron emitters, said grid, electron emitters, and accelerating conductor strips being disposed in planes having parallel relationship with each other and the front of the screen member, a phosphor carried upon the inner front face of the envelope, a readily ionizable gas carried within the screen envelope, a first scanning means comprising a first pulser, a delay line connected to said pulser, taps along said delay line whereby the delay line is connected to each of the accelerating conductor strips, a second scanning means comprising a second pulser, a second delay line connected thereto, taps along the second delay line whereby the said second delay line is connected to each of the strip emitters, an oscillator connected in series with the second pulser between the electron emitters and the grid to maintain in the screen a traveling strip of ions, a signal source connected in series with the first pulser whereby the successively modulated and pulsed accelerator electrodes may cause electrons to fall upon the phosphor from selected portions of the emitters behind the ionized strip, which portions are defined by the intersection of the activated accelerating electrode strip and the strip emitters so as to scan and modulate said screen to form a picture on the front thereof.

2. An apparatus for producing two-dimensional television images comprising, a screen member in the form of a sealed envelope of large viewing face area and shallow depth, said screen having an electrically conductive extended grid intermediate the front and rear inner surfaces of the envelope, a source of reference potential connected to the grid, a plurality of strip electron emitters upon the rear inner face of the envelope, connected through isolating resistors to the said reference potential, a plurality of accelerating conductor strips in front of said grid angularly disposed with respect to the orientation of the strip electron emitters, said grid, electron emitters, and accelerating conductor strips being disposed in planes having parallel relationship with each other and the front of the screen member, a phosphor carried upon the inner front face of the envelope, a readily ionizable gas carried within the screen envelope, a first scanning means comprising a first pulser, a delay line connected to said pulser, taps along said delay line whereby the delay line is connected to each of the accelerating conductor strips, a second scanning means comprising a second pulser, a second delay line connected thereto, taps along the second delay line whereby the said second delay line is connected to each of the strip emitters, a series of diodes inserted between the strip emitters and the second pulser line to isolate said emitters from said line except upon application of a pulse, an oscillator connected in series with the second pulser between the electron emitters and the grid to maintain in the screen a traveling strip of ions, a signal source connected in series with the first pulser whereby the successively modulated and pulsed accelerator electrodes may cause electrons to fall upon the phosphor from selected portions of the emitters behind the ionized strip, which portions are defined by the intersection of the activated accelerating electrode strip and the strip emitters so as to scan and modulate said screen to form a picture on the front thereof.

3. Apparatus as defined in claim 1, in which the ionized gas is carried at a pressure requiring a minimum voltage for its ionization.

4. Apparatus as defined in claim 1, having an oscillator comprising a ringing circuit.

5. An apparatus for producing two-dimensional television images comprising, a screen member in the form of a sealed envelope of large viewing face area and shallow depth, said screen having an electrically conductive extended grid intermediate the front and rear inner surfaces of the envelope, a source of reference potential connected to the grid, a plurality of strip electron emitters upon the rear inner face of the envelope, connected through isolating resistors to the said reference potential, a plurality of accelerating conductor strips in front of said grid angularly disposed with respect to the orientation of the strip electron emitters, said grid, electron emitters and accelerating conductor strips being disposed in planes having parallel relationship with each other and the front of the screen member, a phosphor carried upon the inner front face of the envelope, a readily ionizable gas carried within the screen envelope, a first scanning means comprising, a first multi-resonator frequency scanner, the resonating elements of said first scanner being successively in electrical contact with each of the accelerating condutors along the length of said resonator, a seond scanning means comprising, a second multi-resonator scanner, the elements of which are in electrical contact with each of the strip emitters, a first source of saw-tooth variable frequencies, connected to the first multi-resonator to activate said resonator, a second source of saw-tooth variable frequencies, connected to the second multi-resonator to activate said second resonator to maintain a traveling strip of ions within the tube, a signal source connected in series with the first multi-resonator whereby the successively modulated and activated accelerator electrodes may cause electrons to fall upon the phosphor from selected portions of the emitters behind the ionized strip, which portions are defined by the intersection of the activated accelerating electrode strip and the strip emitters so as to scan and modulate said screen to form a picture on the front thereof.

6. An apparatus for producing two-dimensional television images comprising, a screen member in the form of a sealed envelope of large viewing face area and shallow depth, said screen having an electrically conductive extended grid intermediate the front and rear inner surfaces of the envelope, a source of reference potential connected to the grid, a plurality of strip electron emitters comprising an amalgum surface containing alkali metals upon the rear inner face of the envelope, connected through isolating resistors to the said reference potential, a plurality of accelerating conductor strips in front of said grid angularly disposed with respect to the orientation of the strip electron emitters, said grid, electron emitters and accelerating conductor strips being disposed in planes having parallel relationship with each other and the front of the screen member, a phosphor carried upon the inner front face of the envelope, a readily ionizable gas carried within the screen envelope, a first scanning means comprising a first pulser, a delay line connected to said pulser, taps along said delay line whereby the delay line is connected to each of the accelerating conductor strips, a second scanning means comprising a second pulser, a seond delay line connected thereto, taps along the second delay line whereby the said second delay line is connected to each of the strip emitters, an oscillator connected in series with the second pulser between the electron emitters and the grid to maintain in the screen a traveling strip of ions, a signal source connected in series with the first pulser whereby the successively modulated and pulsed accelerator electrodes may cause electrons to fall upon the phosphor from selected portions of the emitters behind the ionized strip, which portions are defined by the intersection of the activated accelerating electrode strip and the strip emitters so as to scan and modulate said screen to form a picture on the front thereof.

7. An apparatus for producing two-dimensional television images comprising a screen member in the form of a sealed envelope of large viewing face area and shallow depth, said screen having an electrically conductive extended grid intermediate the front and rear inner surfaces of the envelope, a source of reference potential connected to the grid, a plurality of strip electron emitters upon the rear inner face of the envelope, connected through isolating resistors to the said reference potential, a plurality of accelerating conductor strips in front of said grid angularly disposed with respect to the orientation of the strip electron emitters, said grid, electron emitters and accelerating conductor strips being disposed in planes having parallel relationship with each other and the front of the screen member, a phosphor carried upon the inner front face of the envelope, a readily ionizable gas carried within the screen envelope, a first scanning means comprising, a multi-resonator frequency scanner, said scanner being successively in electrical contact with each of the accelerator electrode conductors, along the length of said resonator, a second scanning means comprising, a pulser, a delay line connected to said pulser, taps along the delay line whereby the delay line is connected to each of the strip electron emitters, an oscillator in series with the pulser between the electron emitters and the grid to maintain a traveling strip of ions within the tube, a source of saw-tooth variable frequencies connected to the multi-resonator, a signal source connected in series with the multi-resonator whereby the successively modulated and activated accelerator electrodes may cause electrons to fall upon the phosphor from selected portions of the emitters behind the ionized strip, which portions are defined by the intersection of the activated accelerating electrode strip and the strip emitters so as to scan and modulate said screen to form a picture on the front thereof.

8. An apparatus for producing two-dimensional television images comprising, a screen member in the form of a sealed envelope of large viewing face area and shallow depth, an electrically conductive extended grid consisting of a plurality of parallel conductors intermediate the front and rear inner surfaces of the envelope, a source of reference potential, a flat electron emitter upon the rear inner face of the envelope, connected to the source of reference potential, said grid conductors being connected to the emitter through isolating resistors, a plurality of accelerating conductor strips in front of said grid angularly disposed with respect to the orientation of the grid conductors, said grid, electron emitter and accelerating conductors being disposed in planes having parallel relationship with each other and the front of the screen, a phosphor carried upon the inner front face of the envelope, a readily ionizable gas carried within the screen envelope, a first scanning means comprising a first pulser, a delay line connected to said pulser, taps along said delay line whereby the delay line is connected to the accelerating conductors, a second scanning means comprising a second pulser, a second delay line connected thereto, taps along the second delay line whereby the said second delay line is connected to each of the grid conductors, an oscillator connected in series with the second pulser between the electron emitter and the grid, to maintain in the screen a traveling strip of ions, a signal source connected in series with the first pulser whereby the successively modulated and pulsed accelerator electrodes may cause electrons to fall upon said phosphor from selected portions of the emitter surface behind the ionized strip, which portions are defined by the intersection of the activated accelerating electrode strip and the grid conductors so as to scan and modulate said screen to form a picture on the front thereof.

9. An apparatus for producing two-dimensional television images comprising, a screen member in the form of a sealed envelope of large viewing face area and shallow depth, said screen having an electrically conductive extended grid intermediate the front and rear inner surfaces of the envelope, a source of reference potential connected to the grid, a plurality of strip electron emitters upon the rear inner face of the envelope, connected through isolating resistors to the said reference potential, a plurality of accelerating conductor strips in front of said grid angularly disposed with respect to the orientation of the strip electron emitters, said grid, electron emitters and accelerating conductor strips being disposed in planes having parallel relationship with each other and the front of the screen member, a phosphor carried upon the inner front face of the envelope, a readily ionizable gas carried within the screen envelope, a first scanning means comprising, a multi-resonator frequency scanner, said scanner being successively in electrical contact with each of the electron emitter strips along the length of said resonator, a second scanning means comprising, a pulser, a delay line connected to said pulser, taps along the delay line whereby the delay line is connected to each of the accelerator electrode strips, a source of saw-tooth variable frequencies connected to the multi-resonator to maintain a traveling strip of ions within the tube, a signal source connected in series with the pulser whereby the successively modulated and pulsed accelerator electrodes may cause electrons to fall upon the phosphor from selected portions of the emitters behind the ionized strip, which portions are defined by the intersection of the activated accelerating electrode strip and the strip emitters so as to scan and modulate said screen to form a picture on the front thereof.

ALVIN M. MARKS.

References Cited in the file of this patent

UNITED STATES PATENTS

| Number | Name | Date |
|---|---|---|
| 2,313,286 | Okolicanyi | Mar. 9, 1943 |
| 2,371,643 | Okolicanyi | Mar. 20, 1945 |
| 2,467,786 | Toulon | Apr. 19, 1949 |
| 2,471,253 | Toulon | May 24, 1950 |
| 2,500,929 | Chilowsky | Mar. 21, 1950 |
| 2,595,617 | Toulon | May 6, 1952 |

FOREIGN PATENTS

| Number | Country | Date |
|---|---|---|
| 48,053 | France | Oct. 18, 1937 |
| 48,456 | France | Mar. 8, 1938 |
| 50,433 | France | June 5, 1940 |
| 108,062 | France | May 18, 1943 |
| 368,828 | Great Britain | Mar. 10, 1932 |